(12) United States Patent
Tangirala et al.

(10) Patent No.: US 8,438,833 B2
(45) Date of Patent: May 14, 2013

(54) PARTIAL FILLING OF A PULSE DETONATION COMBUSTOR IN A PULSE DETONATION COMBUSTOR BASED HYBRID ENGINE

(75) Inventors: Venkat Eswarlu Tangirala, Niskayuna, NY (US); Narendra Digamber Joshi, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 904 days.

(21) Appl. No.: 12/370,937

(22) Filed: Feb. 13, 2009

(65) Prior Publication Data
US 2010/0205932 A1    Aug. 19, 2010

(51) Int. Cl.
F02K 7/02    (2006.01)
(52) U.S. Cl.
USPC ............. 60/247; 60/204; 60/39.38; 60/39.76; 60/39.77; 431/1
(58) Field of Classification Search .................. 60/204, 60/247, 39.38, 39.76, 39.77; 431/1
See application file for complete search history.

(56) References Cited

U.S. PATENT DOCUMENTS

| | | | |
|---|---|---|---|
| 3,121,993 | A | 2/1964 | Pennington |
| 4,280,796 | A | 7/1981 | Reinsch |
| 6,062,018 | A | 5/2000 | Bussing |
| 6,668,542 | B2 | 12/2003 | Baker et al. |
| 2005/0279078 | A1 | 12/2005 | Dean et al. |
| 2006/0216662 | A1* | 9/2006 | Lupkes et al. ................ 431/1 |
| 2007/0245712 | A1* | 10/2007 | Shimo et al. ................. 60/249 |
| 2008/0229756 | A1 | 9/2008 | Pinard et al. |

FOREIGN PATENT DOCUMENTS

| | | |
|---|---|---|
| GB | 800871 A | 9/1958 |
| GB | 1246136 A | 9/1971 |
| WO | 2007024047 A2 | 3/2007 |

OTHER PUBLICATIONS

Sanders, Scott T. "Diode-Laser Sensor for Monitoring Multiple Combustion Parameters in Pulse Detonation Engines.", Proceedings of the Combustion Institute, vol. 28, 2000/pp. 587-594.*
Schauer, Fred "Detonation Initiation Studies and Performance Results for Pulsed Detonation Engine Applications.", 39th AIAA Aerospace Sciences Meeting & Exhibit, Jan. 8-11, 2001.*
EP10155968 Search Report Oct. 21, 2010.
J. Hoke et al., "Heat Transfer and Thermal Management in a Pulsed Detonation Engine," AIAA Aerospace Sciences, Jan. 6-9, 2003, XP002600836, pp. 1-5.

(Continued)

*Primary Examiner* — William H Rodriguez
*Assistant Examiner* — Steven Sutherland
(74) *Attorney, Agent, or Firm* — Penny A. Clarke

(57) ABSTRACT

An engine contains at least one pulse detonation combustor having a combustion chamber and an exit nozzle coupled to and downstream of the combustion chamber. During operation of the at least one pulse detonation combustor a detonation occurs within the combustion chamber and at least one of a fuel fill fraction and purge fraction of the at least one pulse detonation combustor are utilized to offset a temperature peak of said detonation from a pressure peak of said detonation. The fuel fill fraction is defined as 1−purge fraction, and the purge fraction is the ratio of the purge time of the at least one pulse detonation combustor to a sum of the purge time of the at least one pulse detonation combustor and a fuel fill time of the at least one pulse detonation combustor.

15 Claims, 5 Drawing Sheets

OTHER PUBLICATIONS

V. E. Tangirala et al., "Systems Level Performance Estimations for a Pulse Detonation Combustor Based Hybrid Engine," Proceedings from ASME Turbo Expo 2008, Power for Land, Sea and Air, XP002600837, Jun. 9-13, pp. 1-19.

J. Kasahara et al., "Thrust Measurement of a Multicycle Partially filled Pulse Detonation Rocket Engine," Journal of Propulsion and Power, vol. 25, No. 6, Nov.-Dec. 2009, XP002600838, pp. 1281-1290.

M. Cooper et al., "Impulse Correlation for Partially-Filled Detonation Tubes," Journal of Propulsion and Power, vol. 20, No. 5, Dec. 31, 2004, Retrieved from the Internet URL:www.galcit.caltech.edu/EDL/publication s/reprints/nozzles.pdf, XP002600839, pp. 1-10.

F. Joos, "Technische Vergrenung," Springer-Verlag Berlin Heidelberg, XP02601300, Dec. 31, 2006, pp. 236-268.

M. Arian et al., "Nozzle Effects on Pulse Detonation engines Performance," European Conference on Computational Fluid Dynamics, ECCOMAS CFD 2006, pp. 1-9.

* cited by examiner

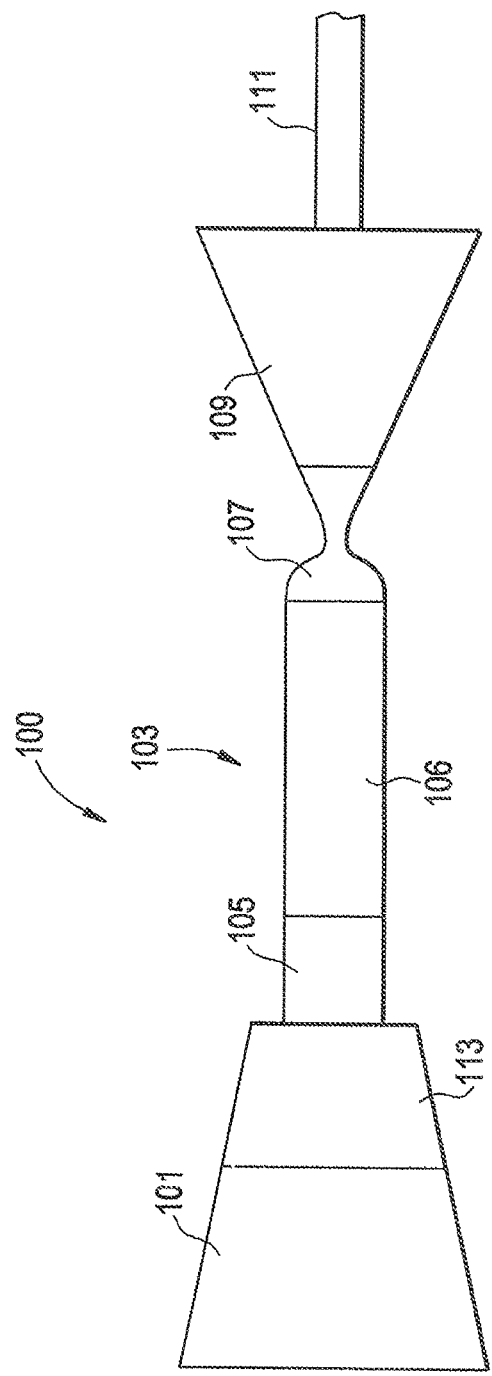

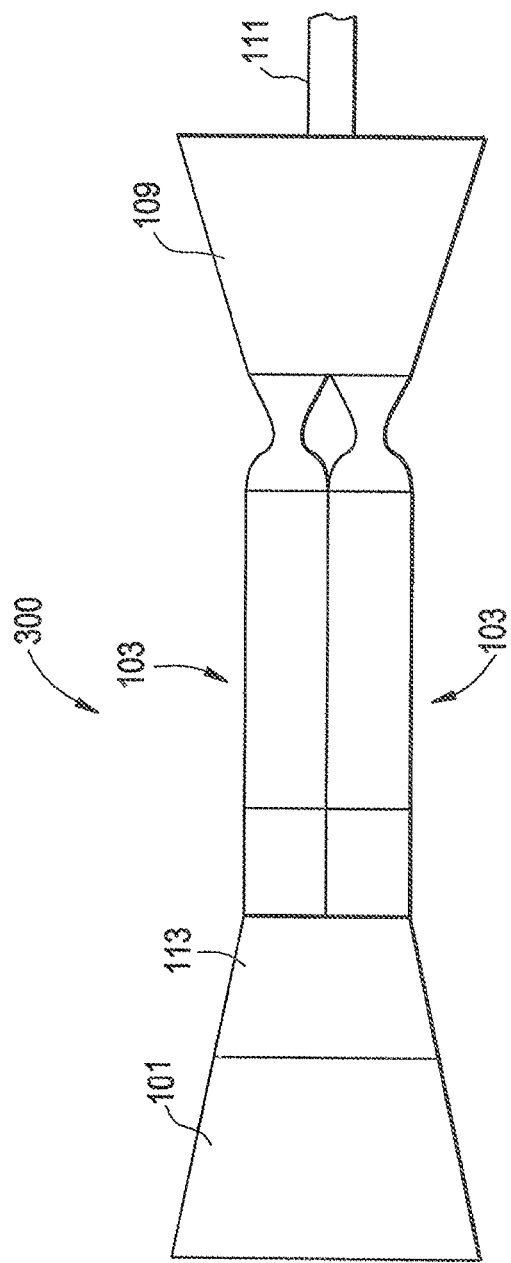

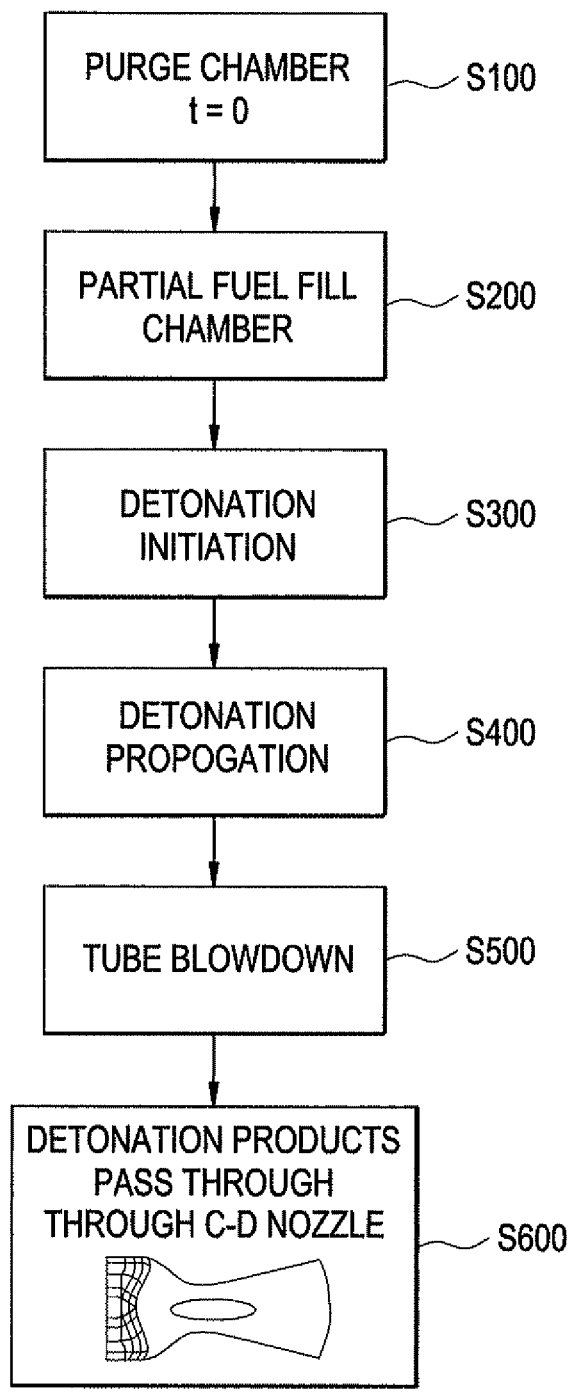

PARTIAL FILLING OF A PULSE DETONATION COMBUSTOR IN A PULSE DETONATION COMBUSTOR BASED HYBRID ENGINE

BACKGROUND OF THE INVENTION

This invention relates to pulse detonation systems, and more particularly, to partial filling of a pulse detonation combustor in a pulse detonation combustor based hybrid engine.

With the recent development of pulse detonation combustors (PDCs) and engines (PDEs), various efforts have been underway to use PDC/Es in practical applications, such as combustors for aircraft engines and/or as means to generate additional thrust/propulsion in a post-turbine stage. Further, there are efforts to employ PDC/E devices into "hybrid" type engines which use a combination of both conventional gas turbine engine technology and PDC/E technology in an effort to maximize operational efficiency. It is for either of these applications that the following discussion will be directed. It is noted that the following discussion will be directed to "pulse detonation combustors" (i.e. PDCs). However, the use of this term is intended to include pulse detonation engines, and the like.

Because of the recent development of PDCs and an increased interest in finding practical applications and uses for these devices, there is an increasing interest in increasing their operational and performance efficiencies.

Additionally, it is known that the operation of PDCs creates extremely high pressure and temperature peaks both within the PDC and downstream components. Because of these high temperature and pressure peaks, during PDC operation, it is difficult to develop operational systems which can sustain tong term exposure to these repeated high temperature and pressure peaks.

Therefore, there exists a need for an improved PDC and method of operating a PDC which provides improved operational efficiencies and reduces the temperature and pressure peaks associated with traditional PDC operation.

SUMMARY OF THE INVENTION

In an embodiment of the present invention, an engine comprises at least one pulse detonation combustor having a combustion chamber and an exit nozzle coupled to and downstream of the combustion chamber. During operation of the at least one pulse detonation combustor a detonation occurs within the combustion chamber and at least one of a fuel fill fraction and purge fraction of the at least one pulse detonation combustor are utilized to offset a temperature peak of said detonation from a pressure peak of said detonation. The fuel fill fraction is defined as 1−purge fraction, and the purge fraction is the ratio of the purge time of the at least one pulse detonation combustor to a sum of the purge time of the at least one pulse detonation combustor and a fuel fill time of the at least one pulse detonation combustor.

As used herein, a "pulse detonation combustor" PDC (also including PDEs) is understood to mean any device or system that produces both a pressure rise and velocity increase from a series of repeating detonations or quasi-detonations within the device. A "quasi-detonation" is a supersonic turbulent combustion process that produces a pressure rise and velocity increase higher than the pressure rise and velocity increase produced by a deflagration wave. Embodiments of PDCs (and PDEs) include a means of igniting a fuel/oxidizer mixture, for example a fuel/air mixture, and a detonation chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, auto ignition or by another detonation (i.e. cross-fire).

As used herein, "engine" means any device used to generate thrust and/or power.

BRIEF DESCRIPTION OF THE DRAWINGS

The advantages, nature and various additional features of the invention will appear more fully upon consideration of the illustrative embodiment of the invention which is schematically set forth in the figures, in which:

FIG. 1 shows a diagrammatical representation of a power generation device in accordance with an embodiment of the present invention.

FIG. 3 shows a diagrammatical representation of a power generation device in accordance with another embodiment of the present invention;

FIG. 4 depicts an operational flow chart of an embodiment of the present invention.

DETAILED DESCRIPTION OF THE INVENTION

Figure 2A:
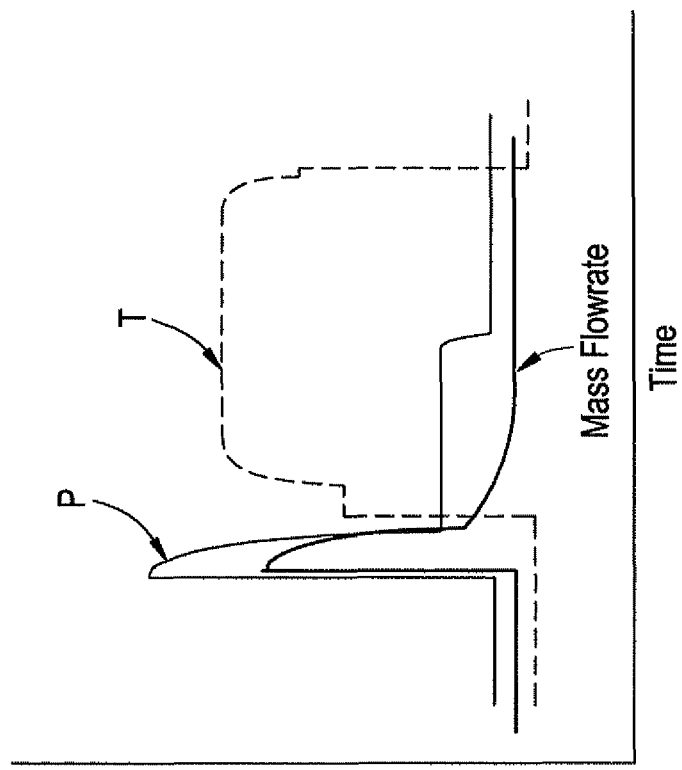
FIGS. 2A and 2B show graphical representations of temperature, pressure and mass flow in a conventional pulse detonation combustor (2A) and a pulse detonation combustor in accordance with an embodiment of the invention (2B)

The present invention will be explained in further detail by making reference to the accompanying drawings, which do not limit the scope of the invention in any way.

FIG. 1 depicts an engine 100 having an air flow inlet 101, at least one pulse detonation combustor 103, and a turbine portion 109. The pulse detonation combustor 103 has an inlet portion 105, a combustion chamber 106 and an exit nozzle 107. In an embodiment of the present invention a shaft 111 is coupled to the turbine portion 109 to extract work during the operation of the engine 100.

In an embodiment of the present invention, the engine 100 is an aircraft engine, while in another embodiment of the present invention, the engine 100 is a ground based engine, as used in various power generation applications. The present invention is not limited in this regard. In a further embodiment of the present invention, the engine is a PDC-hybrid type engine.

The air flow inlet 101 allows for the intake of air flow and directs at least a portion of the air flow to the to the inlet portion 105 of the PDC 103. In an embodiment of the invention, the air flow inlet 101 is a flow direction device which simply directs an air flow into the inlet portion. In a further embodiment of the present invention, the air flow inlet 101 is a compressor, which compresses an air flow entering the engine 100. Because the operation and structure of compressors and other air flow inlets are so well known to those of ordinary skill in the art, a detailed discussion of the air flow inlet 101 will not be included herein.

The air flow inlet 101 is coupled to the inlet portion 105 of the PDC 103 via a manifold structure 113. The manifold structure 113 directs the air flow from the air flow inlet 101 to the inlet portion 105. The manifold structure 113 can be of any known structure, and may comprise diffusers, flow direction vanes and the like. The present invention is not limited in this regard.

As described above, the PDC 103 contains an inlet portion 105, a combustion chamber 106 and an exit nozzle 107. Because those of ordinary skill in the art are well familiar with the general structure and operation of a PDC, the general details will not be discussed herein, except for those portions related to the present invention. The inlet portion 105 is of any known construction and configuration. Downstream of the of the inlet portion 105 is a combustion chamber 106, in which the detonation or deflagration occurs during the operation of the PDC 103. After the detonation/deflagration the exhaust from the combustion chamber 106 passes through the exit nozzle 107.

Further, while the figures depict the PDC 103 and combustion chamber 106 as having a cylindrical shape with a constant cross-section, this depiction is intended to be merely exemplary and the present invention is not limited to this configuration. That is, it is contemplated that the cross-section shape of the PDC 103 and chamber 106 can be non-circular, such as elliptical, octagonal, etc. Additionally, it is contemplated that the PDC 103 and/or the chamber 106 can have a variable cross-section, for example a conical shape.

Figure 5:
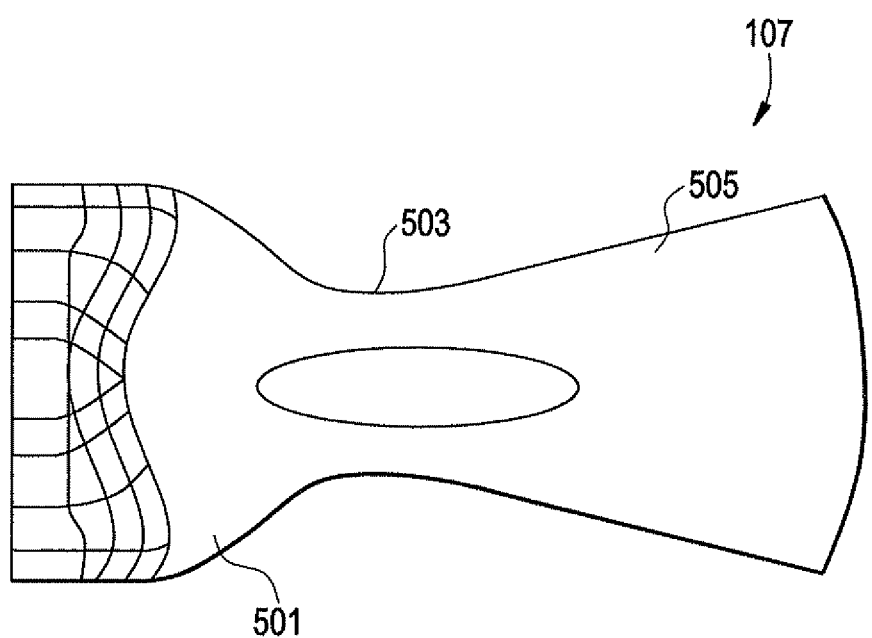
FIG. 5 depicts a diagrammatical representation of a converging-diverging nozzle used with an embodiment of the present invention.

In an embodiment of the present invention, the exit nozzle 107 is integrated into the PDC 103. In a further exemplary embodiment of the present invention, the nozzle 107 is directly coupled to the rotor portion (not shown) of a downstream turbine stage. This aids in controlling the offset between the temperature and pressure peaks during operation of the PDC 103 (which will be discussed more fully below. In an exemplary embodiment of the present invention, the nozzle 107 is a converging-diverging nozzle, as shown in FIG. 1 and FIG. 5. The fundamental structure of a converging-diverging nozzle is known to those of ordinary skill in the art, and thus will not be discussed in detail herein. A brief further discussion is set forth below.

The operation of the PDC 103 in accordance with an embodiment of the present invention will now be discussed.

The operation of the PDC 103 comprises five basic operational steps. They are: (1) the purge process, (2) the fuel fill process, (3) the detonation initiation process, (4) detonation propagation, and (5) tube blowdown. During the purge process, high temperature exhaust products (generated from a previous detonation) are purged or scavenged out of the combustion chamber 106 with a flow of air, or the like. Typically, the inlet portion 105 of the PDC 103 contains a valve structure(s) (not shown) which opens during the purge process allowing the inflow of air, or other purge gas. During the fuel fill process, the valve structure(s) (not shown) remain open, thus continually allowing air to flow into the chamber 106 while fuel is injected into the air traveling into the chamber 106, thus placing a fuel-air mixture into the chamber 106 of the PDC 103. In an embodiment, the air flow into the chamber 106 during the fuel fill process is controlled at a specific velocity. Further, in an embodiment of the invention, the fuel is either injected into the air flow upstream of the inlet portion 105, within the inlet portion 105 or after the inlet portion 105, or a combination thereof. Once the fuel fill process is complete the valve structure(s) (not shown) are closed and the detonation initiation process begins causing detonation of the fuel air mixture within the chamber 106. Various sources to create the detonation are known and will not be discussed herein.

After detonation of the fuel air mixture within the chamber 106 the detonation propagates from the detonation origin, and because the inlet portion 105, through the valve structure(s), is closed the detonation propagation is directed downstream within the chamber 106 towards the exit nozzle 107. In the final stage, the blowdown stage, the detonated materials from the fuel air mixture travel within the chamber 106 toward the exit nozzle 107 and then exit the PDC 103. After the blowdown process is complete the valve structure(s) (not shown) open to begin a new operational cycle (time is t=0 ms).

The actual time t (ms) for a pulse detonation cycle is a function of the design and operational parameters of the PDC 103. For the purposes of the present application the purge time is $t_{purge}$ and the fuel fill time is $t_{fuelfill}$. Thus, as discussed above, the valve structure(s) in the inlet portion 105 are closed at $t=t_{purge}+t_{fuelfill}$. Accordingly, the purge fraction of the PDC 103 is the ratio of $t_{purge}$ to $t_{purge}+t_{fuelfill}$. That is: $t_{purge}/(t_{purge}+t_{fuelfill})$. For the purposes of the present invention the fill fraction of the PDC 103 is 1−purge fraction.

In an exemplary embodiment of the present invention, the PDC 103 is operated so as to have a partial fuel fill. That is, the fill fraction is between 0.9 and 0.1. In another exemplary embodiment, the fill fraction is between 0.5 and 0.1. In exemplary embodiments of the present invention, shock waves from the detonation are employed to compress the fluid within the PDC, and thus a goal is to have the fill fraction within the PDC as small as possible while still sustaining a detonation. Thus, in an exemplary embodiment of the present invention, the minimum purge is at 10%, thus resulting in a fill fraction of 0.1. This is a desirable fill fraction because minimal fuel is being employed, while still maintaining detonation. However, as the fill fraction is decreased the sustainability of the detonation becomes more difficult. Thus, more tuning and optimization of the system is typically required, although within the abilities of those skilled in the art, to maintain lower fill fractions. In another exemplary embodiment of the present invention, the fill fraction is within the range of 0.5 to 0.9. In this embodiment, sustaining the detonation is easier, than when the fill fraction approaches 0.1.

In a further exemplary embodiment of the present invention, the PDC 103 is operated such that the purge fraction is controlled so that the temperature and pressure peaks are offset. Similar to as discussed above, the purge fraction can be adjusted along with the fuel fill fraction to obtain the desired peak offset.

In prior devices, during the fuel fill stage (of PDC operation) the fill is completed resulting in the known concurrence of the high pressure and temperature peaks during PDC operation. It is these peaks and their tendency to occur simultaneously during operation which tend to be limiting factors in the application and use of PDCs in various applications and environments.

In an embodiment of the present invention, only a partial fuel fill and/or an adjustment of the purge fraction is accomplished. When using a partial fuel fill, the fill fraction of this embodiment is less than 1. Having a fuel fill fraction of less than 1 allows the embodiment of the present invention, to have an overall lower temperature peak and pressure peak, and offset the occurrences of the pressure and temperature peaks. This can also be obtained in conjunction with an adjustment of the purge fraction (i.e., the ratio of the amount of time for the purge stage to the time for the purge plus the fuel fill time). In a further embodiment of the presence invention, the benefits are enhanced by coupling the use of partial fuel filling with an integrated nozzle, such as a converging-diverging exit nozzle 107, as shown in FIG. 1. In an embodiment of the invention, the fill fraction is within the range of 0.1 to 0.9, and in another exemplary embodiment, the fill fraction is between 0.1 and 0.5. In a further exemplary embodiment, the fill fraction is in the range of 0.5 to 0.9.

Partial fuel filling together with the flow expansion achieved through the use of an integrated nozzle, such as a converging-diverging nozzle (107) results in the reduction of temperature and pressure peaks experienced during operation, as well as an offset of the operational temperature peak from operational pressure peak and mass flow peak. The pressure peak is reduced by broadening the pressure distribution as a function of time, i.e. spreading the pressure peak over a longer operational time. This pressure peak reduction, in turn, causes the temperature peak to be reduced. By reducing both the temperature and pressure peaks in the PDC operation, the peaks experienced by the components of the turbine stage (109) are reduced.

In an exemplary embodiment, the offset of the temperature and pressure peaks on downstream components, such as the turbine stage, can be at least 1 ms. In a further exemplary embodiment, the offset between the peaks is at least 2 ms. In yet a further exemplary embodiment of the present invention, the offset is in the range of 1 to 30 ms. Offsetting these peaks, as well as reducing the levels of the peaks, results in benefits in the operational durability and life of downstream components. The stresses on downstream components is decreased as these peaks are less in magnitude and are not experienced at the same time.

The reduction of temperature and pressure loads in the turbine 109 allow for easier turbine operation, and thus expand the viability of commercial applications of a PDC.

Figure 2B:
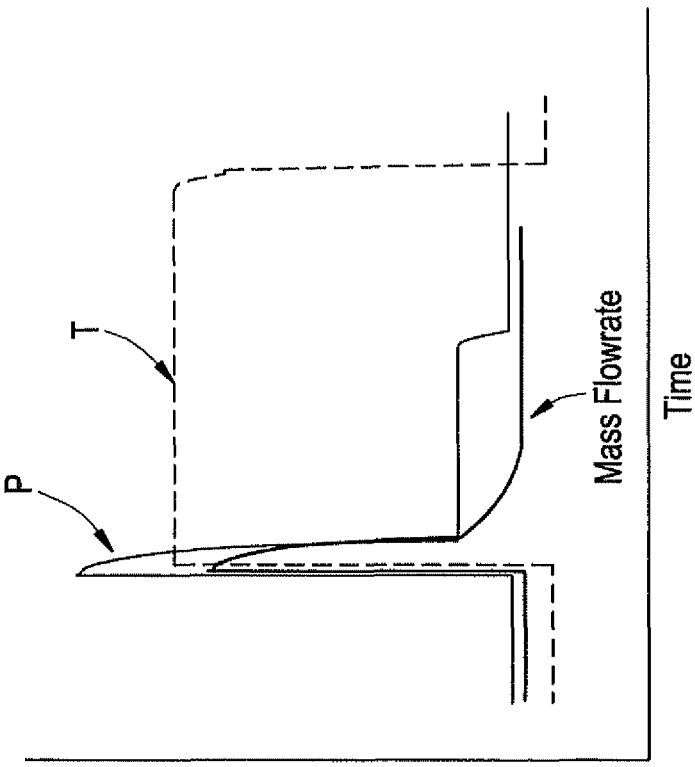

FIGS. 2A and 2B are exemplary depictions of the pressure, temperature and mass flow of a typical PDC (FIG. 2A) and a device in accordance with an embodiment of the invention (FIG. 2B). As shown, in known devices, when the PDC is fully filled in the fuel fill stage and an integrated nozzle is not employed, the temperature peak, pressure peak and mass flow rate peak occur essentially at the same time. For purposes of the present application, the temperature peak is the highest temperature reached during an operational cycle of the PDC and the pressure peak is the highest pressure reached during an operational cycle of the PDC. By having these peaks occur at the same time, high levels of stress and operational difficulties or created on any downstream turbine stage or device. However, in an embodiment of the invention (FIG. 2B) the coupling of a partial fuel fill with an integrated exit nozzle 107, such as a converging-diverging nozzle, results in having the peak levels of each of the temperature, pressure and mass flow lowered, as well as offsetting the temperature peak from the pressure peak, as well as the mass flow peak. In an exemplary embodiment of the present invention, the temperature peak is offset such that it lags behind the pressure peak. As also can be seen the pressure and mass flow peaks are reduced, at least in part, by the broadening of the pressure and mass flow distributions as a function of time. These changes result in improved overall performance of the device as well as increasing the commercial viability of the use of PDCs in various operations, by reducing the temperature, pressure and mass flow loading on any downstream equipment, including a turbine stage 109.

As a result of the reductions discussed above (reduction in peak, temp., and mass flow) the overall equivalence ratio of PDC is reduced, thus effectively acting as if the fuel mixture is lean. Accordingly, the benefits of operating at a reduced equivalence ratio is achieved.

FIG. 5 depicts and exemplary embodiment of a converging-diverging nozzle 107 in accordance with an exemplary embodiment of the present invention. As shown in FIG. 5 (which is an exemplary embodiment), a converging-diverging nozzle 107 has a converging section 501, a throat section 503, and a diverging section 505. The overall dimensions and configuration of the nozzle 107 to be employed is a function of the operational and design parameters of the PDC and the overall system. However, the physical characteristics of a converging-diverging nozzle are to be maintained such that the nozzle acts in accordance with the performance parameters of a converging diverging nozzle. These characteristics include (1) the throat-to-tube diameter ratio in the range of 0.1 to 1.0, (2) the angle of convergence is in the range of 10 degrees to less than 90 degrees, (3) the length of the converging section, (4) the angle of divergence is in the range of 5 to 45 degrees, and (5) the length of the divergence section. Of course, each of these physical parameters are to be optimized based on the operational and performance criteria of the PDC 103 and the engine 100.

FIG. 3 shows a diagrammatical representation of an engine 300 similar in construction to that shown in FIG. 1, except that a plurality of the PDCs 103 are employed. In this embodiment, it is contemplated that the operation of the PDCs 103 can be synced, such that their operation cycles occur at the same time, or alternatively, their operational cycles are staggered. For example, while one PDC is in its blow down stage, another is in its fuel fill stage. The operational timing of the PDCs is a function of the design and performance criteria of the engine 300.

Turning now to FIG. 4 a flow is depicted which shows the operational flow of an embodiment of the present invention. When t=0 (at the beginning of a new PDC cycle the PDC chamber 106 is purged S100. During the purge process S100, high temperature exhaust products (generated from a previous detonation) are purged or scavenged out of the combustion chamber 106 with a flow of air, or the like. Typically, the inlet portion 105 of the PDC 103 contains a valve structure(s) (not shown) which opens during the purge process S100 allowing the inflow of air, or other purge gas. The next step S200 is the partial fuel fill process. In this step S200, the valve structure(s) (not shown) remain open, thus continually allowing air to flow into the chamber 106 while fuel is injected into the air traveling into the chamber 106. In an embodiment, the air flow into the chamber 106 during the partial fuel fill process S200 is controlled at a specific velocity. Further, in an embodiment of the invention, the fuel is either injected into the air flow upstream of the inlet portion 105, within the inlet portion 105 or after the inlet portion 105, or a combination thereof. In an embodiment of the invention, the partial fuel fill step S200 is conducted such that the fill fraction is less than 1. In another embodiment of the invention, the fill fraction is in the range of 0.1 to 0.5, and in another exemplary embodiment, the fill fraction is in the range of 0.1 to 0.9.

Once the partial fuel fill step S200 is complete the valve structure(s) (not shown) are closed and the detonation initiation step S300 begins causing detonation of the fuel air mixture within the chamber 106. Various sources to create the detonation are known and will not be discussed herein.

After detonation of the fuel air mixture within the chamber 106 the detonation propagates from the detonation origin (the detonation propagation step S400), and because the inlet portion 105, through the valve structure(s), is closed the detonation propagation is directed downstream within the chamber 106 towards the exit nozzle 107. In the final step, the blow-down step S500, the detonated materials from the fuel air mixture travel within the chamber 106 toward the exit nozzle 107. The detonated materials then pass through the exit nozzle 107, which is a converging-diverging nozzle S600. This process results in the decreased temperature, pressure and mass flow peaks discussed above, which is equivalent to lowering the overall equivalence ratio of a PDC.

It is noted that although the present invention has been discussed above specifically with respect to aircraft applications, the present invention is not limited to this and can be in any similar detonation/deflagration device in which the benefits of the present invention are desirable.

While the invention has been described in terms of various specific embodiments, those skilled in the art will recognize that the invention can be practiced with modification within the spirit and scope of the claims.

What is claimed is:

1. An engine, comprising:
   at least one pulse detonation combustor having a combustion chamber and a converging-diverging exit nozzle coupled to and downstream of said combustion chamber,
   wherein during an operation of said at least one pulse detonation combustor a detonation occurs within said combustion chamber and at least one of a fuel fill fraction and purge fraction of said at least one pulse detonation combustor are utilized to offset a temperature peak of said detonation from a pressure peak of said detonation,
   wherein said fuel fill fraction is defined as 1−purge fraction, and wherein purge fraction is the ratio of the purge time of said at least one pulse detonation combustor to a sum of said purge time of said at least one pulse detonation combustor and a fuel fill time of said at least one pulse detonation combustor, and wherein an offset of time between said temperature peak and said pressure peak is in the range of 1 to 30 ms.

2. The engine of claim 1, wherein the fuel fill fraction is in the range of 0.1 to 0.9.

3. The engine of claim 1, wherein the fuel fill fraction is in the range of 0.5 to 0.9.

4. The engine of claim 1, wherein the fuel fill fraction is in the range of 0.1 to 0.5.

5. The engine of claim 1, wherein said combustion chamber is only partially filled during a fuel fill stage of its operation.

6. The engine of claim 1, wherein said converging-diverging exit nozzle has a throat-to-tube diameter ratio in the range of 0.1 to 1.0.

7. The engine of claim 1, wherein said converging-diverging exit nozzle has a converging section with a convergence angle in the range of 10 to less than 90 degrees and a diverging section with a divergence angle in the range of 5 to 45 degrees.

8. An engine, comprising:
   at least one pulse detonation combustor having a combustion chamber and a converging-diverging exit nozzle integrated with and downstream of said combustion chamber,
   wherein during an operation of said at least one pulse detonation combustor a detonation occurs within said combustion chamber and at least a fuel fill fraction of said at least one pulse detonation combustor is utilized to offset a temperature peak of said detonation from a pressure peak of said detonation in the range of 1 to 30 ms,
   wherein said fuel fill fraction is between 0.5 and 0.9, and
   wherein said fuel fill fraction is defined as 1−purge fraction, where purge fraction is the ratio of the purge time of said at least one pulse detonation combustor to a sum of said purge time of said at least one pulse detonation combustor and a fuel fill time of said at least one pulse detonation combustor.

9. A method of generating power, comprising:
   partially filling at least one pulse detonation combustor with a fuel-air mixture;
   detonating said mixture within said at least one pulse detonation combustor; and
   passing said detonated mixture through a converging-diverging exit nozzle,
   wherein said detonating step creates a temperature peak and a pressure peak and after said detonated mixtures exits said exit nozzle there is an offset between said temperature peak and said pressure peak in the range of 1 to 30 ms.

10. The method of claim 9, wherein said partial filling of said at least one pulse detonation combustor provides a fuel fill fraction for said at least one pulse detonation combustor in the range of 0.9 to 0.1, where fill fraction is defined as 1−purge fraction, and
    wherein purge fraction is the ratio of the purge time of said at least one pulse detonation combustor to a sum of said purge time of said at least one pulse detonation combustor and a fuel fill time of said at least one pulse detonation combustor.

11. The method of claim 10, wherein the fuel fill fraction is in the range of 0.1 to 0.5.

12. The method of claim 10, wherein the fuel fill fraction is in the range of 0.5 to 0.9.

13. The method of claim 9, wherein said offset between said temperature peak and said pressure peak is at least 2 ms.

14. The method of claim 9, wherein said exit nozzle is a converging-diverging nozzle which has a throat-to-tube diameter ratio in the range of 0.1 to 1.0.

15. The method of claim 9, wherein said converging-diverging exit nozzle has a converging section with a convergence angle in the range of 10 to less than 90 degrees and a diverging section with a divergence angle in the range of 5 to 45 degrees.

* * * * *

UNITED STATES PATENT AND TRADEMARK OFFICE
CERTIFICATE OF CORRECTION

PATENT NO. : 8,438,833 B2  
APPLICATION NO. : 12/370937  
DATED : May 14, 2013  
INVENTOR(S) : Tangirala et al.

Page 1 of 1

It is certified that error appears in the above-identified patent and that said Letters Patent is hereby corrected as shown below:

In the Specification

In Column 1, Line 34, delete "tong" and insert -- long --, therefor.

Signed and Sealed this  
Second Day of July, 2013

Teresa Stanek Rea  
*Acting Director of the United States Patent and Trademark Office*